United States Patent [19]
Herlig

[11] Patent Number: 5,667,829
[45] Date of Patent: Sep. 16, 1997

[54] METHOD AND APPARATUS FOR TREATING MEAT PRODUCTS WITH ULTRASONIC ENERGY IN AN OZONATED WATER ENVIRONMENT

[75] Inventor: Richard K. Herlig, Kansas City, Mo.

[73] Assignee: Medagri, Inc., Shreveport, La.

[21] Appl. No.: 641,423

[22] Filed: May 1, 1996

[51] Int. Cl.⁶ .............................. A22C 18/00; A23B 4/00
[52] U.S. Cl. .................. 426/238; 99/451; 99/536; 426/312; 426/332
[58] Field of Search .................. 426/238, 332, 426/474, 641, 312; 99/451, 536; 422/20, 28, 30

[56] References Cited

U.S. PATENT DOCUMENTS

| | | | |
|---|---|---|---|
| 2,339,507 | 1/1944 | Nagy et al. | 426/312 |
| 4,003,832 | 1/1977 | Henderson et al. | 210/728 |
| 4,504,498 | 3/1985 | Kissam | 426/238 |
| 4,517,159 | 5/1985 | Karlson | 422/20 |
| 4,827,727 | 5/1989 | Caracciolo | 62/63 |
| 4,849,237 | 7/1989 | Hurst | 426/332 |
| 5,053,140 | 10/1991 | Hurst | 210/704 |
| 5,087,466 | 2/1992 | Coudrains et al. | 426/312 |
| 5,227,184 | 7/1993 | Hurst | 426/312 |

*Primary Examiner*—George Yeung
*Attorney, Agent, or Firm*—Dowell & Dowell

[57] ABSTRACT

A process and apparatus for treating meat products with ultrasonic energy in an ozonated water environment to eradicate harmful pathopens from the surface of the meat products.

20 Claims, 1 Drawing Sheet

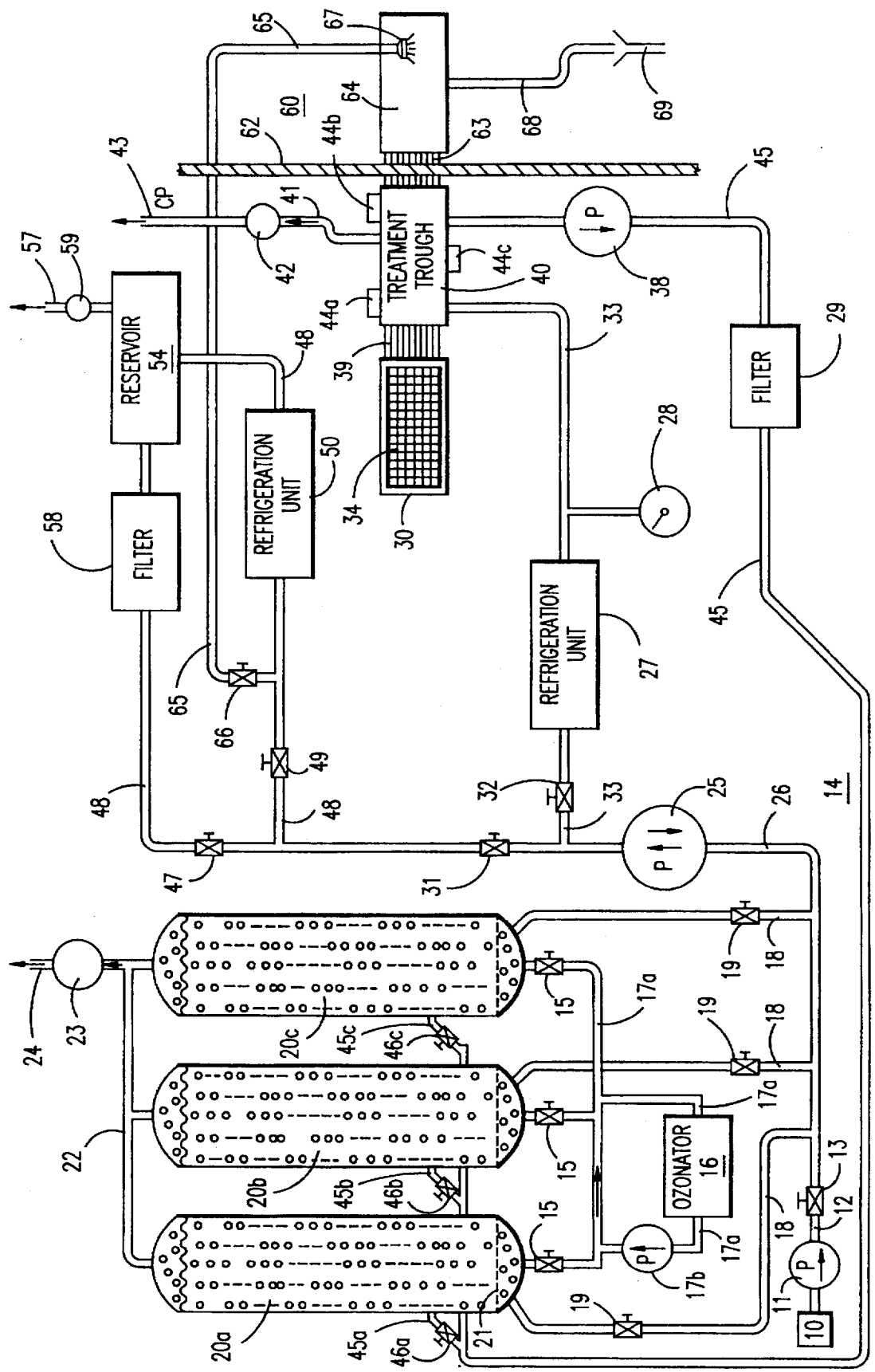

METHOD AND APPARATUS FOR TREATING MEAT PRODUCTS WITH ULTRASONIC ENERGY IN AN OZONATED WATER ENVIRONMENT

BACKGROUND OF THE INVENTION

1. Field of the Invention

This invention is generally directed toward the treatment of food products and, more particularly, to a process and apparatus which applies ultrasonic energy to meat products immersed in an ozonated water environment.

2. History of the Related Art

In the food industry, and particularly the meat products industry, it is important that the products be free of harmful pathogens. In meat processing establishments approved by the United States Department of Agriculture (USDA), veterinarians check the temperatures of knife sterilizing vats, and also check animal carcasses, heads (especially the tongue), and some internal organs for signs of contamination and disease. In establishments approved by individual states, meat is also inspected by veterinarians.

Meat contamination typically occurs when the animal's gastro-intestinal (GI) tract is punctured, allowing feces and undigested food to spread to the carcass. In beef, contamination may also originate from the milk of spent dairy cows. If a meat inspector identifies any contamination from a punctured GI tract, the inspector will carve off that portion of the carcass which has come into contact with the contaminant. It has been estimated that approximately 4.5% of slaughtered animals have GI tracts which were punctured during evisceration. Any undigested food, fetes and/or milk may contain escherichia coli (*E-coli*), salmonella or other deadly bacteria or other less harmful bacteria, increasing the spoilage rate of meat products.

Unfortunately, the conventional inspection system has limitations. Animal carcasses pass an inspection station every few seconds, making it difficult for an inspector to locate every sign of contamination, consequently occasionally allowing contaminated carcasses to continue onto the meat processing states.

In response to recent *E-coli* reports, the federal government has been considering revision of its meat inspection procedures. Notices of "safe handling" have been added to packages of meat products and quick tests for *E-coli* presence have been developed. Recent proposed legislation in the House Agricultural Committee may give added power to inspectors to track the source of harmful contamination back to ranches or farms. This may allow identification of the source of the contamination.

Any processes to rid meat of harmful pathogens must take the conventional processing procedures into consideration. Animals used for food are cooled as fast as possible after slaughter. The carcasses are typically cut in half down the backbone to facilitate further handling. A beef half can weigh over 400 pounds and the typical market hog half weighs approximately 90 pounds. The half carcasses are graded and then processed into portions. Beef is cut into primals (wholesale cuts like loins, ribs, rounds, etc.) and boxed. Lower quality beef processed for hamburger is completely deboned and the meat is ground and usually frozen. A high percentage of *E-coli* bacteria is found in hamburger produced from spent cattle. Freezing does not kill *E-coli* or salmonella bacteria. Hog carcass halves are conveyed to a processing line where they are taken apart. The back leg (ham) is taken off with a saw. The front leg is removed, the ribs are pulled out and the belly is cut from the loin. The separated parts are then conveyed for further processing.

It is feasible to intercept carcass sections between the cooler (where the carcass is cooled from slaughter) and the processing line and subject the meat to pathogen eradication procedures. To be effective, however, these procedures should not disrupt the established process. The eradication procedures should be compatible with conventional meat processing steps and should also be cost-effective.

Several methods are known for treating food products, including meat products, with ozonated water to reduce the amount of pathogens contained on the surface of the food products (see for example U.S. Pat. Nos. 4,849,237 and 5,227,184 to Hurst and U.S. Pat. No. 4,827,727 to Caracciolo).

It is also known to apply ozone and sonic energy to sterilize and oxidize waste water as described in U.S. Pat. No. 4,003,832 to Henderson, et al. A method of sterilization for hospital instruments in which the instruments are sterilized by submersion in ultrasonically vibrated, ozonated water or other liquids such as alcohol or naphtha is described in U.S. Pat. No. 4,517,159 to Karlson.

Thus, there has been a need for a process and apparatus for treating meat products more effectively and efficiently than the known processes. If meat products are allowed to soak in water for too long of a time, the meat will absorb some of the water. Under current laws, beef products are not allowed to contain added water, and chicken products are only allowed to contain up to 8% added water. Thus, any effective process should not allow the meat products to soak in water for an extended time.

In view of the limitations and deficiencies associated with the known meat treating processes and apparatus, and particularly those intended to eradicate harmful pathogens, there is a need for an improved pathogen eradication process and apparatus which is cost-effective, time efficient and compatible with conventional processing lines.

SUMMARY OF THE INVENTION

The present invention has been made in view of the above described limitations and deficiencies of the known meat treatment processes, steps and apparatuses, and has as an object to provide a pathogen eradication process and apparatus in which meat products are immersed for a short time in ozonated water which is subjected to ultrasonic energy.

It is another object of the present invention to provide a meat treatment process and apparatus in which a cold water ozone bath containing meat products is subjected to ultrasonic energy to increase the effectiveness of the ozone in the eradication of pathogens from the meat.

It is yet another object of the present invention to provide a pathogen eradication process and apparatus for meat products which provides a backup to conventional inspection systems.

Additional objects and advantages of the present invention will become apparent from the detailed description which follows, especially when considered in conjunction with the accompanying drawing figures.

To achieve the objects of the present invention as described herein, the method and apparatus for meat processing in accordance with a preferred embodiment of the invention comprises applying ultrasonic energy to an ozonated water bath containing meat products. The ultrasonic energy dislodges pathogens from the surface of the meat, breaks up clumps of bacteria and viruses to enable the ozone to more effectively attack them, and accelerates the release of the single oxygen atom (the free radical) from the ozone molecule. Thus the addition of the ultrasonic energy increases the efficiency and effectiveness of the ozone in rendering the pathogens harmless. Ozone is known as an outstanding bactericide and virus deactivant. The limited amount of immersion time helps to prevent the meat products from retaining measurable amounts of water.

BRIEF DESCRIPTION OF THE DRAWINGS

In the accompanying drawing:

The Figure is a schematic diagram of a pathogen eradication process for meats in accordance with an embodiment of the present invention.

DESCRIPTION OF THE PREFERRED EMBODIMENT

With reference to the drawing, a preferred embodiment of a process and apparatus for pathogen eradication for meats is illustrated. In the illustrated embodiment, water from a conventional water source 10, such as a city water supply enters through a water stream 12 into a selected number of ozonation tanks, such as the three ozonization tanks 20a, 20b and 20c illustrated. The water contained in the ozonization tanks is ozonated by means of a commercial ozonator 16. A diffusion grid 21 may be used in each of the three tanks 20a, 20b, and 20c to help spread the ozone throughout the tanks. An ozone vent 22 leading to a vent 24 to the outside atmosphere is preferably mounted to the top of each of the three tanks. The vent system can optionally include an ozone destruction device 23 for converting ozone back into $O_2$ if the amount of ozone venting to the atmosphere is excessive. Each of the three ozonation tanks is preferably at least about eight feet tall and preferably has a capacity of at least about 90 to 100 gallons of ozonated water.

A water stream 26 is provided to feed ozonated water from the ozonization tanks to a treatment trough 40. In a preferred embodiment, the treatment trough 40 is about 1½' deep, about 2' wide, and about 4' long. Such a 12 cubic foot trough is capable of holding 90 gallons water, matching the capacity of each of the ozonation tanks. An ozone monitor 28 may be provided to monitor the concentration of ozone in the ozonated water being supplied to the treatment trough 40.

A food support means such as food loading platform 30 is provided for holding a food product treatment tray 34 which supports meat products and the like. The food product treatment tray 34, composed of stainless steel or another corrosion-resistant material, is preferably comprised of metal bars in a grid shape similar in appearance to an oven rack.

A conveying means, such as conveyor 39, conveys food products contained on the treatment tray 34 to the treatment trough 40 which includes ultrasonic energy applicators 44a, 44b and 44c. Preferably prior to adding any liquid to the trough, the conveyor 39 conveys the tray 34 through a door (not shown), for example a sliding door (not shown) provided in the end of the trough 40.

Although it is preferred to utilize three ultrasonic energy applicators 44a, 44b, and 44c in the trough 40 as shown in the drawing figure, any number of ultrasonic energy applicators can be used. The ultrasonic energy applicators should be effective to provide ultrasonic energy to ozonated water and meat products contained within the treatment trough 40.

The trough 40 preferably includes a tight-fitting lid (not shown) with an ozone vent 41 leading to a vent 43 to the atmosphere outside of the building to prevent ozone escaping from the ozonated water into the work place atmosphere. The vent system can optionally include an ozone destruction device 42 for converting the ozone back into $O_2$ if the amount of ozone venting to the atmosphere is excessive.

A food unloading platform 64 is provided in a cleanroom 60 separated from the treatment room 14 by a wall 62. In the preferred embodiment, a door (not shown) in the end of the trough 40 opens and a conveyer 63 is provided for moving the tray 34 through an opening (not shown) in the wall 62 to the cleanroom 60. The cleanroom preferably has a slight positive air pressure to assist in preventing harmful airborne materials from entering into the cleanroom.

A water spraying stream 65 with shut-off valve 66, which may include spray-jets 67, is connected to a cleaned water reservoir 54 for spraying the meats in the cleanroom 60 with additional chilled ozone-treated water after the ozonated water has been returned to the ozonation tank and the meats conveyed to the cleanroom 60. A stream 68 is provided to discard waste water to a drain 69. Alternatively, the water spraying of the meats may be conducted in the treatment room within the treatment trough. However, this alternative would undesirably lengthen the time the meats are in the treatment trough after being treated.

The apparatus of the present invention preferably includes, a pair of filters 29, 58 for filtering out larger particulates in the water, the cleaned water reservoir 54, and a pair of refrigeration units 27, 50. The reservoir 54, which contains ozone-treated water, should have sufficient capacity to contain at least about a one-day supply of water. For example, a 500 gallon capacity is readily sufficient when using three, 90 to 100 gallon capacity ozonation tanks. If several series of processes are run simultaneously, a reservoir large enough to hold the water for all of the simultaneous processes is preferred. For example, if three different treatment systems, including nine total ozonation tanks, are run simultaneously, a reservoir of at least about 1000 gallons can be utilized. A smaller reservoir can be utilized by treating the water for each set of tanks separately. The reservoir 54 preferably has an ozone vent 57 to the atmosphere outside of the building to prevent ozone escaping from the ozonated water into the work place atmosphere. The vent system can optionally include an ozone destruction device 59 for converting the ozone back into 02 if the amount of ozone venting to the atmosphere is excessive.

A return stream 45 is provided for returning water from the treatment trough 40 back into the tanks 20a, 20b and 20c after meats have been treated. Although the water could be simply returned through the entrance stream 33, it is preferable to provide the separate return stream 45 in case any pathogens are contained in the water. A pump 38 is provided for pumping water through stream 45. Stream 45 breaks into side streams 45a, 45b, and 45c, controlled by valves 46a, 46b, and 46c respectively, for returning the post-treatment water back into individual tanks 20a, 20b, and 20c respectively.

The process of the present invention is easily and efficiently accomplished. Preferably each day the three ozonation tanks are filled with tap water. Valve 13 is opened and pump 11 is activated to pump the tap water from source 10 through stream 12 into each of three branch streams 18. Each of three valves 19 are opened and the water fills each of the three ozonization tanks 20a, 20b and 20c.

Prior to treating any meat products, ozonator 16 and ozonation pump 17b are activated and each of three valves 15 are opened to direct ozone through stream 17a into each of the three tanks 20a, 20b, and 20c to provide ozone treated water in the tanks 20a, 20b, and 20c. Tap water, while potable, typically contains a number of impurities including minerals such as iron, copper and calcium, and also probably chlorine. The ozone oxidizes these impurities effectively eliminating them or otherwise rendering them harmless.

Preferably at least once each day, all three valves 19, and valves 31 and 47 are opened with valves 13, 32, and 49 closed, and two-way pump 25 is activated such that the ozone treated supply of water from each of the three tanks 20a, 20b, and 20c is directed by the pump 25 from each of the three streams 18 to stream 26 and subsequently to stream 48. The ozonated water passes through preferably non-metallic filter 58 which filters out iron, other metals, and other suspended solids. The water is then held in reservoir 54 and cooled to about 1° C. by the refrigeration unit 50, after which valves 49, 31 and the three valves 19 are opened with valves 13, 32, and 47 closed. The cooled water is then pumped again by pump 25 back into each of the three ozonation tanks 20a, 20b, and 20c. Some water is preferably left in the reservoir 54 for later use in spray cleaning meats products. Thus it may be necessary to fill, or almost fill, the three ozone tanks 20a, 20b, and 20c with tap water two or more times to provide enough water to fill reservoir 54.

The water contained in the ozonization tanks 20a, 20b, 20c is re-ozonated by ozonator 16 as may be necessary to maintain the desired ozone concentration. A preferred ozone solution concentration of about 12 mg. of ozone per liter of water is achieved by adding to the tanks an ozone/air stream 17a from ozonator 16 containing about 1.5 to 2.0% or more ozone by weight. Meat products, such as pork or beef products, are arranged onto the food product treatment tray 34 within the food loading platform 30. The conveyer 39 conveys the food treatment tray 34 from the loading platform 30 into the treatment trough 40. With the valve 19 for the first ozonation tank 20a open, along with valve 32, and with the other two valves 19 closed along with valves 13 and 31, ozonated water from the first ozonization tank 20a is pumped by pump 25 and directed through the stream 26 to branch stream 33. The water passes through refrigeration unit 27 and ozone concentration monitor 28 before being added to the meat containing treatment trough 40 to completely immerse the meat products in ozonated water.

The water is preferably kept at about 1° C. throughout the process. Refrigeration units 27 and 50 are provided for this purpose. As the air in the treatment room is preferably kept at about 50° F., only a small amount of cooling is needed to keep the water around 1° C. Thus, energy usage is not a significant expense in using the process.

Sufficient ozonated water to provide an ozonated water bath to immerse the meat products, generally at least about 90 to 100 gallons, is added to the treatment container in just a few seconds using a high power pump 25. The pump 25 utilized should be capable of pumping about 90–100 gallons of water, enough to immerse 90–100 lbs. of meat, in a short time, preferably about 15 seconds or less. The trough 40 is preferably capable of holding a batch of at least 90 lbs of meat products and the treatment of each batch preferably lasts between about 1–2 minutes, and more preferably about 1½ minutes. While a longer time may be used, the overall time for meat processing would be undesirably increased, as could the possibility of excessive water being absorbed by the meat products. At least for some of the time, and preferably for the entire duration of time that the meat products are in the water, each of the ultrasonic energy applicators 44a, 44b and 44c is activated to subject the ozonated water and contained meat products batch to the ultrasonic action. The ultrasonic applicators "shake" pathogen particles, dislodging them from the surface of the meat into the water where they are more effectively treated by the ozone. After treating the meat products, the water is then rapidly removed from the treatment trough 40 and pumped by pump 38, through stream 45, passing through filter 29 which filters out any suspended solids such as fats and subsequently through side-stream 45a, with valve 46a open and valves 46b and 46c closed, and back into the first ozonization tank 20a.

After treatment, the meats are conveyed from the now empty of ozonated water treatment trough 40 through an opening (not shown) in the wall 62 and onto the food unloading platform 64 in the cleanroom 60. In the preferred embodiment, a door (not shown) in the end of the trough 40 opens and the tray 34 is conveyed through the opening in the wall 62 to the cleanroom 60 and onto the food unloading platform 64. Valve 66 is opened to provide water for spraying the meat products with cooled ozonetreated water through stream 65 directly from the cleaned water reservoir 54. After being sprayed with the ozone-treated water, the clean meats are ready for conventional further processing. A second batch of meat products is then arranged onto another food product treatment tray 34 within the food loading platform 30, and then conveyed to treatment trough 40. As explained above for the treatment of the first batch of meat products, ozonated water from the second ozonization tank 20b is added to the treatment trough 40 until the second batch of meat is immersed. The second batch of meat products are treated in the same manner as the first batch and, then again, after treatment, valve 46b is opened, with valves 46a and 46c closed, and the ozonated water is recycled by pump 38 through streams 45 and side stream 45b through the filter 29 back into the second ozonization tank 20b.

During the period when meat products are being treated with the ozonated water from the second ozonization water tank 20b, any remaining harmful pathogens shaken off the first batch of meat products within the treatment trough by the ultrasonic applicators are now contained within ozonization water tank 20a where they are continuously treated by ozone contained in the tank 20a. A third batch of meat products is arranged onto another food product treatment tray 34 on the food loading platform 30 and conveyed to the treatment trough 40 where ozonated water from the third ozonization water tank 20c is added to immerse the meat and the meat is treated in the same manner as the first and second batches. After treatment, the third batch of meat is conveyed through the wall 62 onto the food unloading platform 64 where it is unloaded for further processing. After the treatment, with valve 46c open and valves 46a and 46b closed, the third batch of water is returned by pump 38 through streams 45 and 45c back into the ozonization tank 20c where additional ozone is added to treat any harmful pathogens still remaining in the water.

After treatment with water from the third ozonation water tank 20c, the process is repeated again beginning with water from the first ozonation tank 20a.

Although the present invention is illustrated with the preferred three ozonization tanks, any lesser or greater number of ozonization tanks such as one, two, or four or more could be effectively used in accordance with the present invention. While the process described above operates with the water from one of the three tanks, any remaining pathogens contained within the ozonated water of the other two tanks are treated by the ozone in those two tanks, thus effectively providing at least three times the treatment time for pathogens as would be available by simply running meat products through a trough of ozonated water.

It is important that very little, if any, water weight be added to the meats, particularly for beef products. If water weight is found to be added to the meats, drying steps, such as the use of a pull vacuum for example, may be included in the process to remove any excess water.

The addition of the ultrasonic energy to the ozonated water and the immersed meats provides several benefits. Pathogens or other bacteria on the surface of the meats are loosened up from the surface and clumps of pathogens and other bacteria are broken up by the ultrasonic energy, effectively providing more surface area for the ozone to attack. Additionally, the ultrasonic energy distributes the ozone in the water, increasing the ozone circulation over the meat. The ultrasonic energy also accelerates the release of the extra oxygen atom from the ozone molecule. The free oxygen is believed to attack and break down the DNA of the bacteria and viruses to render them harmless.

Utilizing three ozonation tanks as illustrated in the preferred embodiment described above, it is expected that at least about 4000 pounds of meat can be treated per hour. Accordingly, over a ten hour day, at least forty thousand pounds of meat can be treated. By linking three parallel processes together using a single water reservoir, well over one-hundred thousand pounds of meat may be treated each day.

The foregoing description of the preferred embodiments of the invention has been presented to illustrate the principles of the invention and not to limit the invention to a particular embodiment as illustrated. It is intended that the scope of the invention be defined by all of the embodiments encompassed within the following claims and any and all equivalents thereof.

What is claimed is:

1. A process for the eradication of pathogens from the surface of meat products, comprising the steps of:

mixing ozone with water to provide an ozonated water bath;

immersing the meat products in said ozonated water bath; and subjecting said ozonated water bath and the immersed meat products to an amount of ultrasonic vibration effective to dislodge pathogen containing particles from the surface of the meat products into said ozonated water bath, the dislodged pathogens being treated with an amount of the ozone in the ozonated water bath effective to render the pathogens harmless.

2. The process of claim 1, further comprising the steps of:

providing a treatment container;

conveying the meat products into said treatment container;

subsequently introducing the ozonated water bath into the treatment container; and wherein said step of subjecting said ozonated water bath and the immersed meat products to an amount of ultrasonic vibration is conducted within said treatment container.

3. The process of claim 2, further comprising the step of separating the meat products from the ozonated water containing the dislodged pathogens from the meat products.

4. The process of claim 3, wherein the step of separating comprises removing the ozonated water from the treatment container and subsequently removing the meat products from the treatment container.

5. The process of claim 4, further comprising the step of conveying the removed meat products to a cleanroom.

6. The process of claim 5, wherein said meat products are sprayed with ozone-treated water after being conveyed to said cleanroom.

7. The process of claim 6, wherein said cleanroom has a positive air pressure.

8. The process of claim 4, wherein the ozonated water is contained in at least one storage container prior to being introduced into the treatment container, and wherein the ozonated water is returned to said at least one storage container after the ozonated water is removed from the treatment container.

9. The process of claim 8, wherein said at least one storage container is at least one ozonation tank including means for adding ozone to water contained within the ozonation tank.

10. The process of claim 9, wherein said at least one ozonation tank is a plurality of ozonation tanks.

11. The process of claim 10, wherein said plurality of ozonation tanks is three ozonation tanks, each having a height of at least about eight feet and a capacity of at least about 90 gallons of water and each containing a diffusion grid for dispersing ozone throughout the ozonation tank.

12. The process of claim 11, wherein said plurality of ozonation tanks are programmed to treat a plurality of batches of meat products sequentially.

13. The process of claim 12, wherein said plurality of ozonation tanks are first, second and third containing tanks programmed in a sequence such that a first batch of meat is treated with ozonated water from said first containing tank, subsequently a second batch of meat products is treated with ozonated water from said second containing tank, and subsequently a third batch of meat is treated with ozonated water from said third containing tank, and then said sequence is repeated.

14. The process of claim 4, wherein the meat products are immersed in the ozonated water bath for a time period of between about 1–2 minutes prior to the step of separating the meat products from the ozonated water containing the dislodged pathogens.

15. The process of claim 14, wherein said ultrasonic vibration is applied to said ozonated water and the immersed meat products for approximately said time period.

16. A process for the eradication of pathogens from the surface of meat products, comprising the steps of:

mixing ozone with water to provide an ozonated water mixture;

introducing a first portion of the meat products into a treatment container;

introducing an amount of said ozonated water mixture to said treatment container to fully immerse said first portion of the meat products;

maintaining said first portion of meat products immersed in said ozonated water mixture for between about 1 to 2 minutes, and simultaneously subjecting said ozonated water mixture and the immersed meat products to an amount of ultrasonic vibration effective to dislodge pathogens from the surface of the meat products into the ozonated water mixture, where the dislodged pathogens being treated with an amount of the ozone in the ozonated water bath effective to render the pathogens harmless;

separating the meat products from the ozonated water containing the dislodged pathogens; and conveying the meat products to a cleanroom having a positive air pressure.

17. An apparatus for the eradication of pathogens from the surface of meat products, comprising:

an ozonator for providing a supply of ozone;

a source of water;

means for mixing said ozone with said water;

containing means for containing the mixed ozone and water;

a treatment container having a capacity effective to hold about one-hundred pounds of meat products along with about one-hundred gallons of water;

means for producing ultrasonic vibration within said treatment container;

conveying means for transporting the mixed ozone and water from said containing means to said treatment container;

filling means for filling said treatment container with the mixed ozone and water from said conveying means to a level sufficient to submerse any meat products contained in the treatment container;

transporting means for transporting the mixed ozone and water from said treatment container to said containing means.

18. The apparatus of claim 17, wherein said containing means is a plurality of containing tanks which are programmed to treat a plurality of batches of meat products sequentially.

19. The apparatus of claim 18, wherein said plurality of containing tanks are first, second and third containing tanks programmed in a sequence such that a first batch of meat is treated with ozonated water from said first containing tank, subsequently a second batch of meat products is treated with ozonated water from said second containing tank, and subsequently a third batch of meat is treated with ozonated water from the third containing tank, and then said sequence is repeated.

20. The apparatus of claim 19, further comprising:

a cleanroom having a positive air pressure; and a conveying means for conveying meats from the treatment container to said cleanroom.

* * * * *